United States Patent
Laor

[19]

[11] Patent Number: 6,002,331
[45] Date of Patent: Dec. 14, 1999

[54] METHOD AND APPARATUS FOR IDENTIFYING AND TRACKING CONNECTIONS OF COMMUNICATION LINES

[76] Inventor: Herzel Laor, 2050 Hillsdale Cir., Boulder, Colo. 80303

[21] Appl. No.: 09/119,363

[22] Filed: Jul. 20, 1998

[51] Int. Cl.[6] .............................. G08B 1/08; G01R 19/00
[52] U.S. Cl. .................... 340/539; 340/825.54; 455/3.1; 333/24 R; 324/66; 324/539; 359/110; 385/135
[58] Field of Search ..................... 340/539, 505, 340/651, 825.54; 324/66, 67, 538, 539, 543; 333/24 R; 375/257; 455/3.1, 6.2; 359/110, 150; 385/135, 15, 31, 48, 76

[56] References Cited

U.S. PATENT DOCUMENTS

| | | | |
|---|---|---|---|
| 4,449,247 | 5/1984 | Waschka, Jr. .............................. | 340/505 |
| 4,760,327 | 7/1988 | Walsh et al. ............................... | 324/66 |
| 5,202,940 | 4/1993 | Betts ........................................ | 359/154 |
| 5,222,164 | 6/1993 | Bass, Sr. et al. .......................... | 385/14 |
| 5,265,187 | 11/1993 | Morin et al. .............................. | 385/135 |
| 5,305,405 | 4/1994 | Emmons et al. ........................... | 385/73 |
| 5,353,367 | 10/1994 | Czosnowski et al ..................... | 385/135 |
| 5,394,503 | 2/1995 | Dietz, Jr. et al. ........................ | 385/135 |
| 5,420,512 | 5/1995 | Spillane et al. ........................... | 324/539 |
| 5,448,675 | 9/1995 | Leone et al. .............................. | 385/135 |
| 5,461,693 | 10/1995 | Pimpinella ............................... | 385/135 |
| 5,463,706 | 10/1995 | Dumont et al. ........................... | 385/32 |
| 5,666,453 | 9/1997 | Dannenmann ........................... | 385/101 |

*Primary Examiner*—Donnie L. Crosland
*Attorney, Agent, or Firm*—Holme Roberts & Owen LLP

[57] ABSTRACT

A communication line identification apparatus and method which automates the identification of communication line is engaged with a particular adapter within a communications system. A communication transducer (140) is mounted on a connector (122) of the communication line (118). The communication transducer (140) contains identification information for the communication line (118). Mounted near the adapter (114) which engages the connector (122), is an adapter transducer (138) which receives the identification information from the communications transducer (140). This identification information is transmitted to a system controller which provides the communication systems operator with the information about which communication line is connected to which adapter.

51 Claims, 6 Drawing Sheets

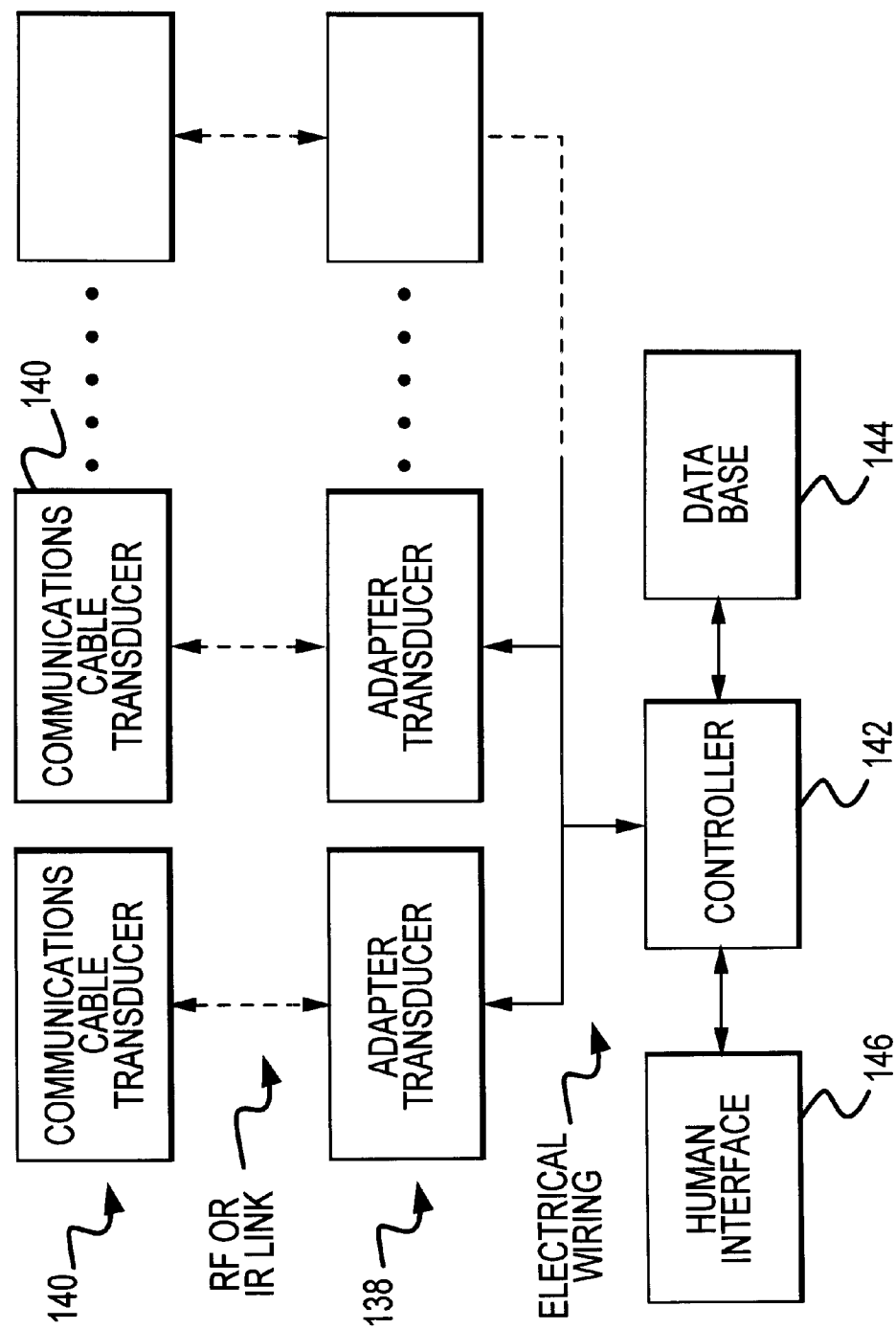

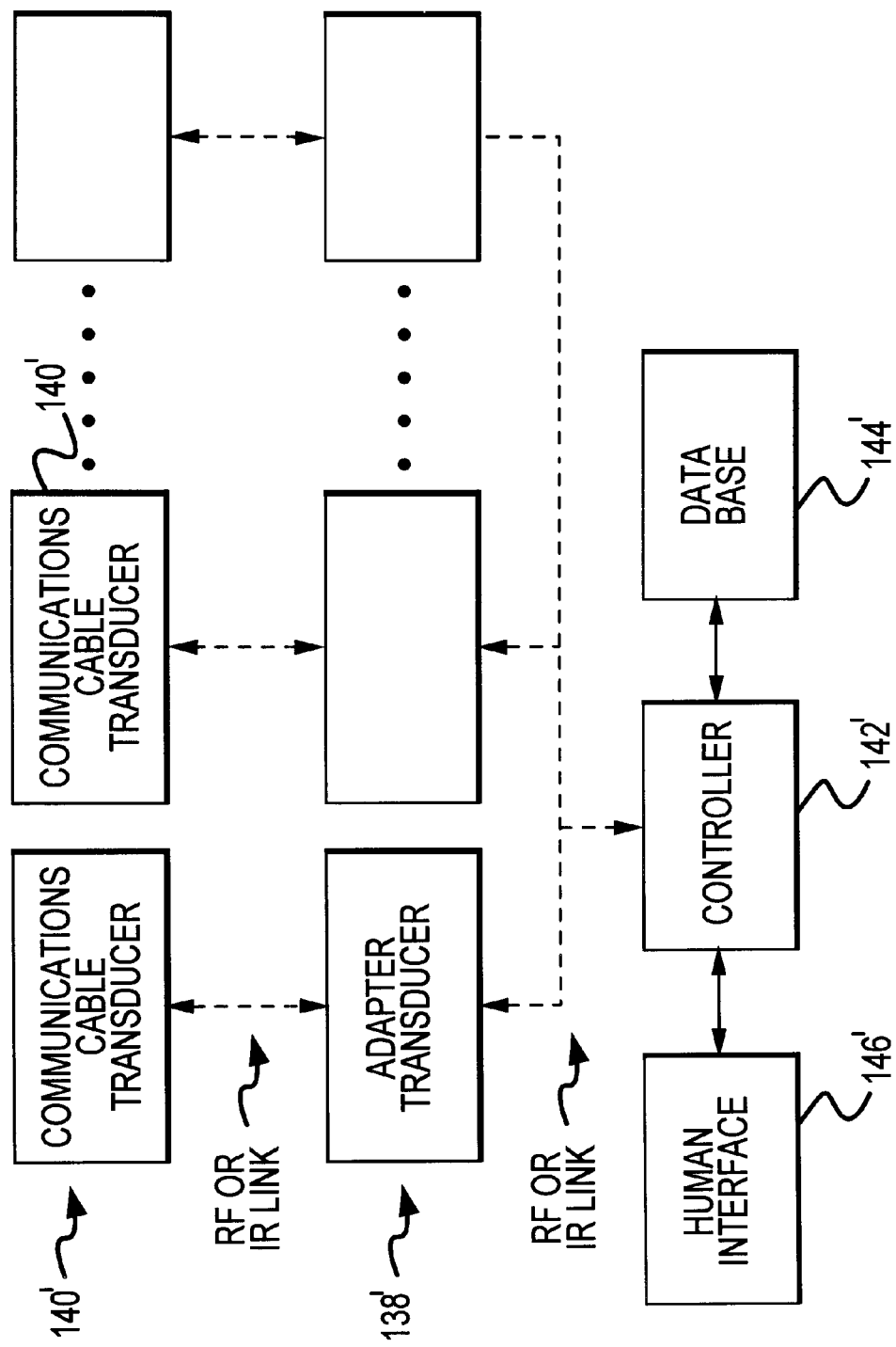

METHOD AND APPARATUS FOR IDENTIFYING AND TRACKING CONNECTIONS OF COMMUNICATION LINES

FIELD OF THE INVENTION

The present invention relates to identifying and tracking communication line connections, and more specifically, to utilizing transducers which are associated with connection lines and adapters to provide connection instructions and status information.

BACKGROUND OF THE INVENTION

Modern communications systems, such as fiber optics communications systems, require interconnection of various communications lines within the system. Such interconnections are provided, for example, in connection with switches, receiver/transmitter units provided at intervals along a single optical line for regenerating optical signals (e.g., to facilitate transmission over long distances), at optical/electrical interfaces, in connection with test equipment, and in a variety of other situations. In this regard, various sites within the system have large communications panels to which large numbers of communication lines may be connected. A panel may be comprised of several modules, with each module having an array of, for example, 256 or more adapters which may receive connections from the communications lines. The communication lines are usually a number of cables bundled together with the cable ends separated for making connections. The incoming cables are individually connected to adapters in a patch panel, and the outgoing cables are individually connected to adapters in a second or the same patch panel. Patch cords may be used to link adapters in one panel to adapters in either the same panel or the second panel.

The connections and disconnections of communication lines to and from the panels are often made manually by a technician. The technician identifies the cable end and the adapter at which the cable is to be connected or disconnected. The technician then plugs a connector at the end of each cable into the appropriate adapter and reports the connections and/or disconnections to a central record system. This manual connecting and reporting system creates a significant possibility of human error when configuring a communications system.

If there has been an error in connecting or reporting connections in a large system, it may be difficult to trace individual cables through a maze-like collection of other cables. Also, it may be difficult to identify the proper adapter to which a particular cable end should be connected or disconnected, or to identify a particular cable end. Numerous cables in a system may have the same types of connectors and be visually indistinguishable. Also, it requires a considerable amount of care to select the correct adapter which is located in a large array of adapters on a patch panel. Thus, ensuring that the proper connections are made can be very time-consuming, and the process is prone to errors in both the making of connections and in keeping records of the connections.

SUMMARY OF THE INVENTION

The present invention is directed to an apparatus and method for monitoring connections of communications lines including inter alias transmission elements (e.g., lines and adaptors) to be connected, reporting connection status, and/or tracking network connections. In accordance with the present invention, a communication line, such as would be used in a communication system, includes a communication transducer for the communication line. When establishing a connection the communication line is engaged by an adaptor. Located proximate to the adaptor, e.g., on or near the adaptor, is an adaptor transducer which communicates with the communications transducer. The transducer is identified by identification information which, in turn, can be used for communicating connection information between a controller and the elements that are, or are to be, connected. The connection information is sufficient to identify the line/adapter connection. For example, one of the transducers associated with either the line or the adaptor may communicate identification information such as a code to the other transducer which, in turn, communicates such identification information to the controller. The controller may also obtain identification information regarding the other of the line and the adaptor, for example, via communicated identification information or based on knowledge of the pathway by which the communication was received. The controller can thereby uniquely identify the connection based on such connection information. In one embodiment, the communication line transducer is self powered, e.g., by energy derived from signals transmitted by the adaptor transducer, and is operative to transmit identification information regarding the communication line. It will be appreciated that the connection information can also be transmitted from the controller to the transducers of an adaptor and/or line to be connected based on the identification information. This connection information can be used to provide an indication, e.g., an audible or visible signal, to a technician to facilitate making the desired connection. For example, LEDs may be lighted to identify the elements to be connected or to indicate whether a connection is correct or incorrect.

The above apparatus and method can be used with almost any type of communication line which carries information signals. As will be understood from the description below, the invention is particularly useful in connection with fiber optic networks where the communication lines are generally not adapted for directly transmitting identification or status information to a network controller.

In one aspect of the invention, the transducers communicate through the exchange of electromagnetic signals. The communication transducer may include a radio transmitter which transmits a radio signal containing the identification information which is received by the adaptor transducer. In another aspect, the transducers may exchange signals in the form of light energy.

In order to avoid including a power source in the communications transducer, a isolated self-powering chip may be used which has identification information for a line programmed into it. In order to activate the isolated chip, the adaptor transducer sends out a radio or light signal which is received by the communications transducer. This radio signal provides the power for the isolated chip to transmit back the identification information to the adaptor transducer.

The communications and adaptor transducers may be included as part of a larger system. The system includes a controller which receives and processes the identification information, and provides connection status data and/or identification data for the communication line-adaptor connections. In connection with the controller is a database in which the connection status information can be stored. A user interface is provided so that the system operator may monitor the connections remotely as well as provide programming for the system configuration.

A communication system may include at least one communication panel in which a number of the adaptors are located to receive the communication lines. Each of the communication lines has a communication transducer mounted thereon, and an adaptor transducer mountable proximate to each of the adaptors. Also located proximate to each of the adaptors is an indicator such as a visual indicator. The adaptor transducer and the indicator are connected to the system controller. When a communication line is engaged in an adaptor, identification information is transferred from the communications transducer to the adaptor transducer. The controller receives all the identification information from all the adaptor transducers and processes this information. This connection status information is used to establish whether the correct connections have been made. Conversely, the controller can activate the indicators based on the identification information to provide assistance to a technician who is manually making connections at the communications panel.

DESCRIPTION OF THE DRAWINGS

FIGS. 3A and 3B show system diagrams for tracking communication line connections;

DETAILED DESCRIPTION

Figure 1:
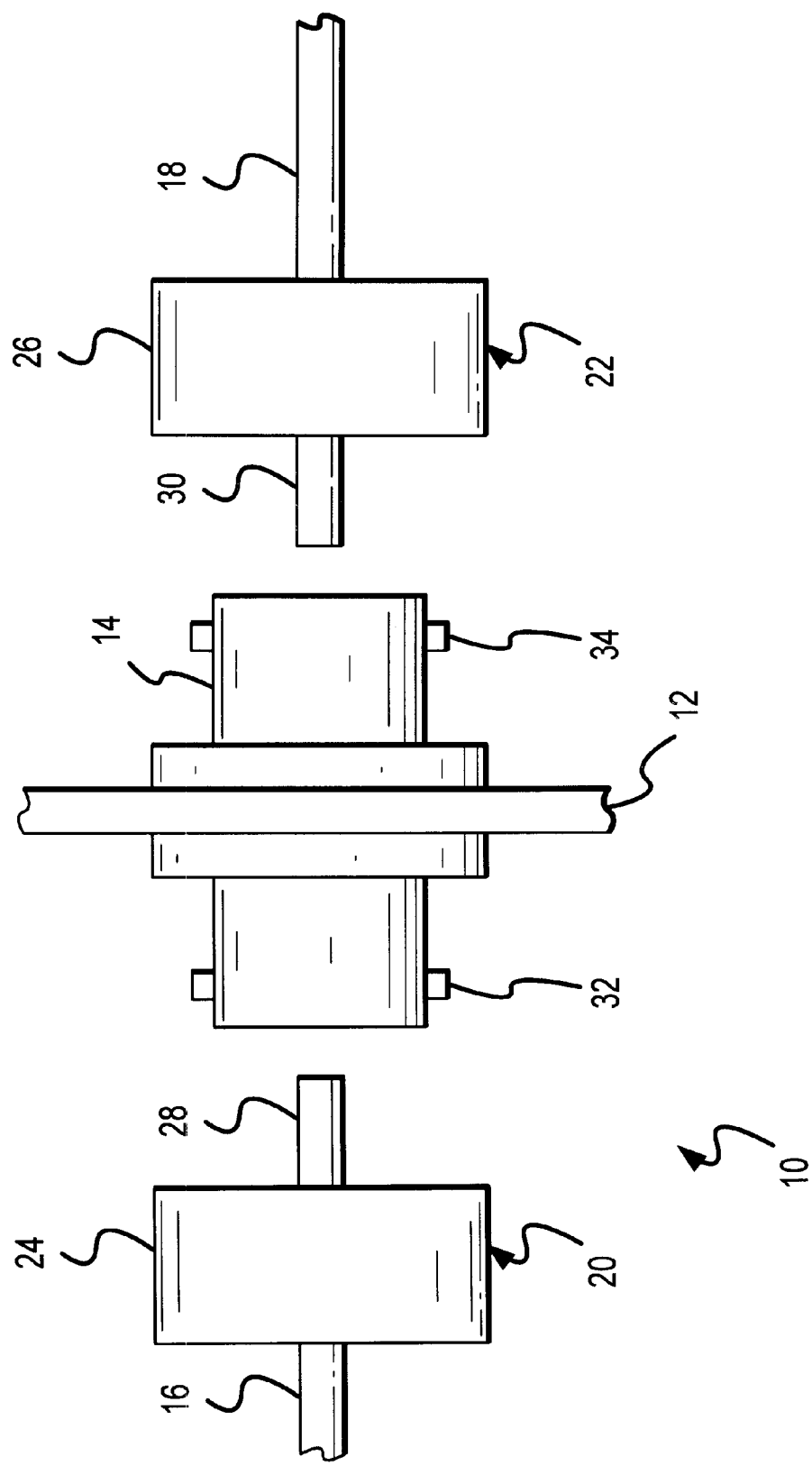
FIG. 1 is a view of a prior art system for connecting fiber optics communications cables.

Shown in FIG. 1 is a prior art fiber optics connection apparatus 10. This apparatus provides a connection, for example, between a fiber optic cable and a switching panel within a communications system. A bulkhead 12, such as might be part of a communications panel, is equipped with adapter 14 that provides an optical connection between cables 16 and 18. Connectors 20 and 22 connect to adapter 14 through use of locking mechanisms 32 and 34 which may include mating protrusions and grooves in connectors 20 and 22 and housings 24 and 26. Ferrules 28 and 30 extend from the housings and carry the optical communications between the cables 16 and 18 through an opening in adapter 14.

In a typical communications system, many communication lines are run in parallel and from time to time are connected through a communications panel which routes the signals on to other communication lines and ultimately to their final destination. These communication panels may have hundreds of adapters to receive and transfer communication signals from one line to another. Presently, the connection of the communication lines to the communications panel are made manually by a technician who must first find the correct cable (perhaps among hundreds), plug it into the appropriate adapter (which also must be identified by the technician), and then communicate this information back to a remote site where it is recorded. The record of the system configuration is based on the technician's report. Because of the manual nature of finding, making and reporting connections, significant elements of time, frustration and human error are introduced into monitoring a communications network.

The invention described herein is a communications line connector configuration which removes a significant amount of the human element in monitoring connections in a communications system. Although the invention is described in terms of a fiber optic communications network and has particular advantages in connection therewith, one skilled in the art would know that certain aspects of the invention described herein are equally applicable to other communications networks, including those which transmit electrical signals.

Figure 2:
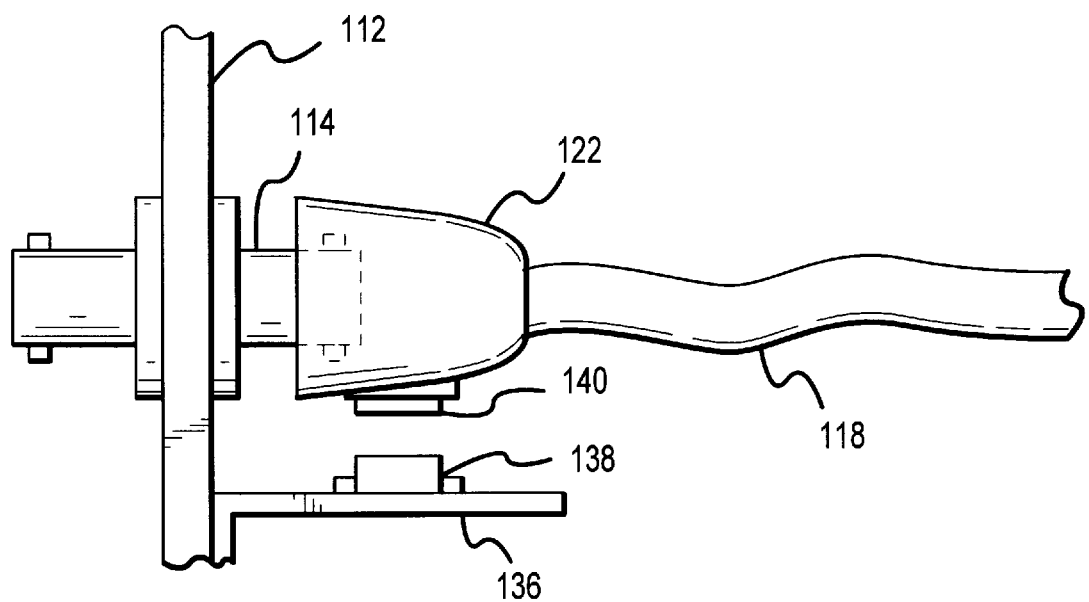
FIG. 2 is a view of the connection between a communications line and an adaptor in accordance with the present invention.

An embodiment of the invention is disclosed in FIG. 2. A communication line 118 which carries the communications signals terminates at connecter 122. Adapter 114 is mounted on bullhead 112 of a communications panel and is designed to receive and engage the connector 122. Bracket 136 is also mounted to bulkhead 112 adjacent to the adapter and supports adapter transducer 138. Alternatively, the transducer could be directly mounted on the bulkhead 112. Communications transducer 140 is mounted on or integrated into the housing for connector 122. When the connector 122 is engaged with the adapter 114, transducers 138 and 140 are preferably in close proximity to each other so as to avoid communication with transducers of elements adjacent to the other connected elements. In this regard, the transducers preferably have a sensing range between about 1–10 mm, and do not respond to signals from transducers that are, for example, more than 25 mm away. Alternatively, the transducers may communicate over greater distances and use a more complicated signaling process to avoid disabling signal interference.

The illustrated transducers 138 and 140 are programmed to communicate with each other. Within the communication system, the communications line 118 has a unique identification code assigned to it. This unique identification information can be programmed into transducer 140. Alternatively, where transducer 140 is provided from the manufacturer with its own pre-programmed code, the pre-programmed code can be stored in a system controller for use as the communications line identification code or correlated to a separate code. When the adapter 114 and connector 122 are engaged, the transducers are in close proximity to each other and the identification information for the communications line passes from the communications transducer 140 to the adaptor transducer 138. The identification information received at the adaptor transducer 138 can then be used by a controller which monitors which communications lines are connected to, or are to be connected to, which adaptor.

It will thus be appreciated that, in the illustrated embodiment, it is useful to establish a connection between a connector and an adaptor such that the transducers are in close proximity. The manner for accomplishing this depends on the nature of the connector and adaptor. In this regard, some connectors and adaptors are not selective concerning the angular orientation of the elements that are being interconnected. In such cases, care may be required on the part of the technician to align the connector and adaptor so as to minimize the distance between the transducers upon establishing the connection. Other connector/adaptor systems include a pair of diametrically opposed protrusions on one of the elements and a mating pair of grooves on the other element. These protrusions and grooves allow for only two possible angular orientations of the elements. In this case, the technician should exercise care in selecting the correct polarity for proper alignment of the transducers. Finally, other connector/adaptor systems only allow for one angular alignment of the elements. Such systems are particularly well-suited for implementation of the present invention as the opportunity for human error in relation to transducer positioning is minimized.

There are a variety of different transducers which may be used in passing the identification information from the communications line to the controller. In one embodiment of the invention, transducer 140 is a radio signal transmitter of limited range and, transducer 138 receives this radio signal when transducer 140 is within a certain distance. In this case, the communications transducer 140 would have its own power source in order to transmit the radio energy.

In another embodiment of the transducer, an isolated computer chip is placed in transducer 140 with the identification information for the communications cable programmed in to it. The adapter transducer 138 is configured such that it continually outputs a querying radio signal. When communications transducer 140 is within a predetermined distance from the adapter transducer, the querying radio signal, which is received via an RF antenna formed in the chip, activates the isolated computer chip. The radio signal received from the adapter transducer, provides power to the isolated computer chip to transmit the identification information for the communication line. Such isolated chips are well-known and are used, for example, in certain smart cards. The adapter transducer 138 receives the identification information and provides it to a controller which is monitoring the connection. An advantage of this embodiment is that no permanent power source is required on the communications transducer.

Other possibilities exist for transducers which would work in the monitoring system described herein. These other embodiments include optical transducers which pass light signals back and forth, or any other appropriate signaling technology. Yet another embodiment for the transducers is the establishment of a direct electrical connection between the transducers when the connector 122 is engaged with the adapter 114.

The apparatus described above may also include a system for processing and storing the identification information. One embodiment of such a system is illustrated in FIG. 3A. Communications transducer 140 and adapter transducer 138 are shown with a dotted line connection between them. This dotted line signifies that this is not necessarily a direct electrical connection between the two, but instead information can be transferred between the two transducers with electromagnetic, optical, or other types of signals. In direct connection with the adapter transducer 138 (or otherwise in communicating with transducer 138) is controller 142. Controller 142 receives the connection information to/from the adapter transducer 138. This connection information includes identification information for the communications line as well as identification information for the adapter which is engaged with the communications line. The controller 142 is connected to database 144 as well as a user interface 146. The user interface allows the system operator to make queries and receive information back as to the connection status of the communications system and to identify elements that are to be connected. Any connection status information received may be stored in database 144.

FIG. 3B shows an alternative system configuration including communications transducers 140', adapter transducers 138', a database 144' and a human interface 146' generally corresponding to the system of FIG. 3A. However, in FIG. 3B, the adapter transducers 138' communicate with the controller via RF or infrared signals rather than via direct electrical wiring.

Figure 4:
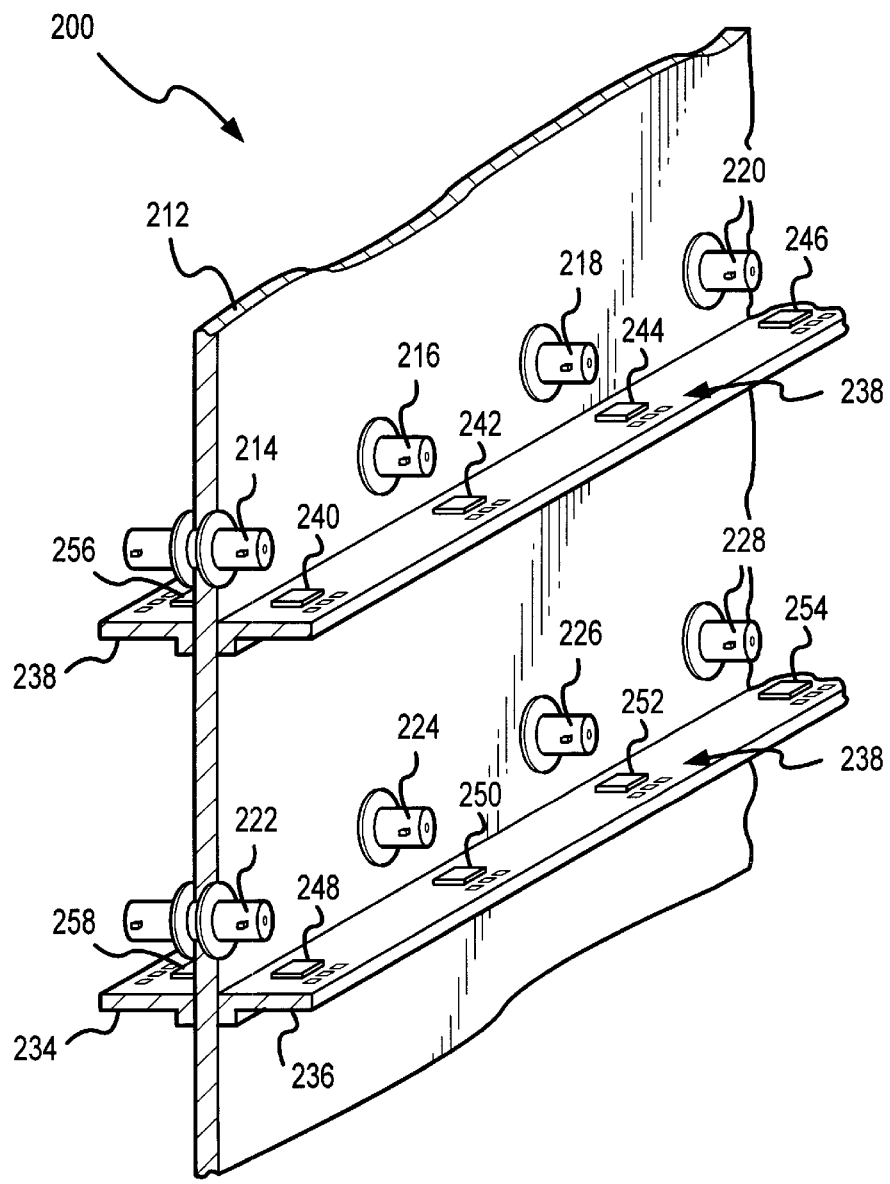
FIG. 4 is a perspective view of a portion of a communications panel in accordance with the present invention.

The elements of the invention described above may be part of a large communications system in which many communication lines terminate at each bulkhead or patch panel. Great advantage can be gained by providing a system which electronically monitors these connections instead of having to rely on a visual inspection by a remote technician. Shown in FIG. 4 is a portion of one patch panel within a communications system. Patch panel 200 includes bulkhead 212 and a plurality of adapters 214–228. Beneath the adapters and extending laterally from bulkhead 212 are brackets 230–236. The adapter transducers 240–258 are mounted proximate to each adapter on the brackets. Also mounted on the brackets proximate to the adapters are rows of light emitting diodes (LED) 238. Each of the adapter transducers shown in FIG. 4 are in connection with the controller in the same manner as was described in FIG. 3. Also in connection with the controller are the LED's. The LEDs 238 provide a connection status for adapters 214–228. In the embodiment shown, there are three individual LED's for each side of each adapter. The LED's serve a variety of purposes which will be described in greater detail below.

In operation, communication lines are connected to the adapters in order to direct the communications signals. As was described above, a communications transducer which contains identification information is mounted on the connector for each of the communications lines. When the connector on the communication line engages an adaptor, identification information is passed to the adaptor transducer, which in turn provides this information for the controller. This information may be stored in the database or used by the controller to provide connection status information either through the user interface, or the LED's Providing connection status information through the LEDs may assist a technician in establishing correct connections at the communications bulkhead. In one embodiment of the invention, there are three LED's associated with each adaptor and they are red, yellow and green the system operator may program, through the user interface, the desired configuration of the communications panel. When the technician begins making connections according to the pre-programmed configuration, the LED's can be used to inform the technician whether an incorrect or correct connection is made. For example, if the technician makes a correct connection, the controller may be programmed to illuminate the green LED proximate to the adapter in which the connection was just made. Conversely, if an incorrect connection was made, the red LED will illuminate. With the present system, not only is notification provided to the technician of the incorrect connection, information is also accessible as to the identity of the communications line which connected incorrectly. It will thus be appreciated that a system operator can thus enter, via the user interface, information sufficient to identify a connection, e.g., an identifier for an adaptor and a connector that are to be connected. This information, or portions thereof, is stored in a central database and/or in memory at a panel or at the adaptor. When a connection is made, an identifier for the line is transmitted to the adapter transducer and corresponding reported connection information can be compared to the stored information to verify a connection. Additionally, the reported information can be stored for use in system tracking.

Further, assistance may be provided to the technician if there is trouble or otherwise to assist locating the adaptor to which a particular connection is to be made. For example, for a particular connection, a query can be made of the system operator. The operator enters the pertinent information for the communication line through the user interface, and the controller illuminates the yellow LED at the adaptor which is to receive the connection. the technician can then make the appropriate connection. Described above is just one embodiment of the invention using the LED's, the controller, the database, and the user interface. One skilled in the art would realize that a variety of programming and monitoring techniques could be developed using the above elements.

Figure 5:
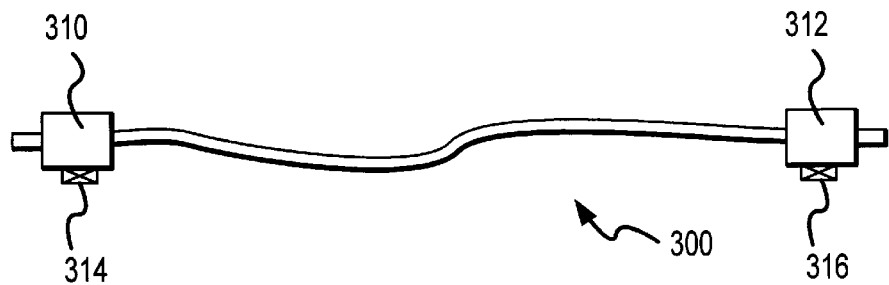
FIG. 5 is a view of a patch cable in accordance with the present invention.

The present invention can also be used to track serial connections of a particular communications line that may include multiple optical cables arranged in series with intervening adaptors, panels, bulkheads, receiver/transmitter units, etc. In this regard, it may be necessary to make connections directly between adapters, for example between adapter 218 and adapter 226. A patch cable, such as the cable shown generally as 300 in FIG. 5 may be utilized to make such a connection. Patch cable 300 has two ends with connectors 310 and 312 mounted at either end. Each of the connectors 310 and 312 has a communications transducer 314 and 316 mounted on its housing. Once connector 310 is plugged into adapter 218, communications are established between communications transducer 244 and adapter transducer 314. Similarly, when connector 312 is plugged into adapter 226, communications are established between communications transducer 252 and adapter transducer 316.

In order to facilitate tracking of serial connections of a particular line, the identification numbers programmed into the transducers of a patch cable, or the identification numbers of transducers of separate elements that are to be interconnected to form a single line, can be in series or another pattern. For example, the transducer patch cable such as cable 300 can be programmed so that the cable 300 has an odd end and an even end. That is, the transducers of first cable ends of such cables, such as transducer 314, may have an identification number defined as 2N−1 (e.g., 1, 3, 5, 7 . . . ) and the opposite transducers, such as transducer 316, may have an identification number defined as 2N (e.g., 2, 4, 6, 8 . . . ). The associated adaptor transducers can be programmed accordingly. In this manner, for example, a system operator desiring to light LED's so as to indicate to a technician the proper connections for a patch cable can simply enter, via the user interface, two successive numbers. Similarly, if successive elements of a line are programmed to include serially arranged transducer identification numbers, the connections for that line or a segment thereof can be identified by entering a string of successive serial numbers. Similarly, two adapter transducers associated with one bulkhead adapter may have serial numbering, with the numbers listed properly in a database. For equipment such as transceivers, optical amplifiers, test equipment etc., any numbering system may be used.

Figure 6:
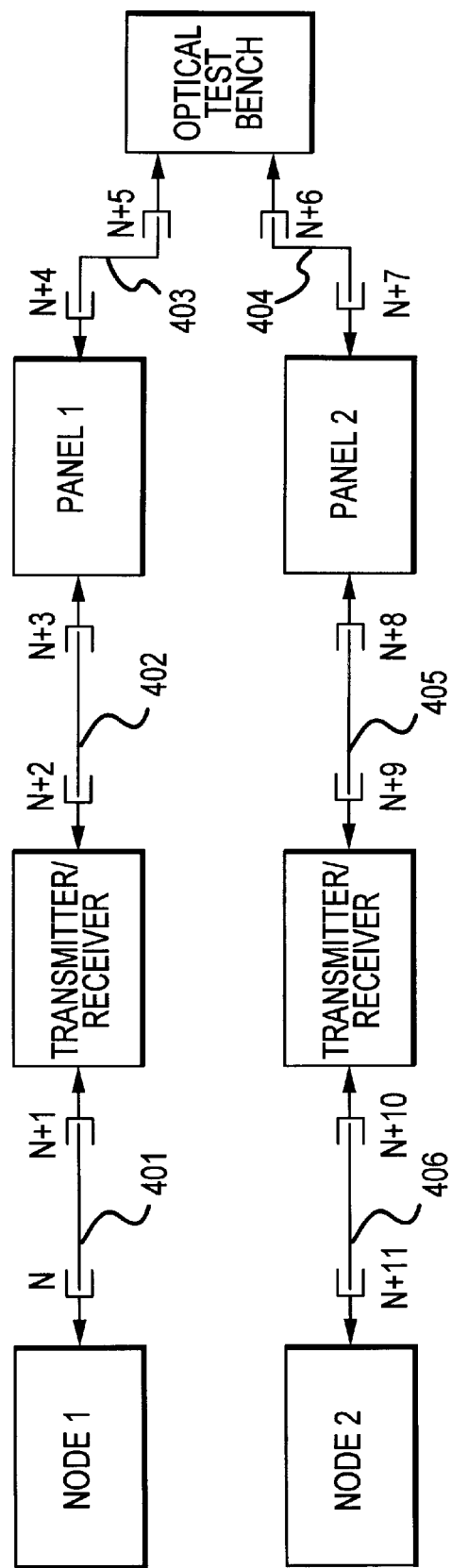
FIG. 6 is a schematic diagram showing a sequential connector numbering system in accordance with the present invention.

Conversely, if the operator wished to obtain a picture of a given line, the operator could enter the associated string of numbers and select an appropriate display or print function. For example, FIG. 6 schematically illustrates a series of connections for establishing a communications pathway between a first node (Node 1) such as first termination equipment or a terminal and a second node (Node 2). For the purposes of the present example, the series of connections is identified only by the identification numbers of transducers on patch cords but it will be appreciated that other identification numbers could be utilized. Node 1 is interconnected to a transmitter/receiver unit via patch cord 401 having a first end transducer identification N and a second end transducer identification N+1. The illustrated transmitter/receiver unit effectively operates as an optical signal repeater to facilitate transmission of optical signals over long distances without unacceptable signal attenuation. The transmitter/receiver unit in turn is interconnected to communications panel 1 via patch cord 402 having transducer identifications N+2 and N+3.

In the illustrated communications pathway, an optical test bench is interposed in the signal pathway between panel 1 and panel 2. Such a test bench may be used for any of a variety of purposes, including testing the connections and configuration of the pathway. In the illustrated embodiment, panel 1 is interconnected to the test bench via patch cord 403 including transducer identifications N+4 and N+5, and the test bench is interconnected to panel 2 via patch cord 404 including transducer identifications N+6 and N+7. Finally, panel 2 is connected to a second transmitter/receiver unit via cord 405 having identifications N+8 and N+9; and then to node 2 via cord 406 having identifications N+10 and N+11. It will be appreciated that a network monitoring system can receive information concerning the identity and types of components (e.g., nodes, panels, text equipment) along the pathway. A remote network operator can thus conveniently obtain a picture of the overall pathway by simply entering the ID code for Node 1, and the controller will retrieve the connection information one at a time and display the whole connection on the user interface.

One of the distinct advantages of the invention described above, is that many if not all of its elements may be incorporated into the design of a new communications system or may be retrofitted on to an existing system. For example, the communications transducers may be mounted on to an already existing connector housing for a communications line, e.g., using an adhesive, or it may be integrated into the design of the housing for a new system. The adaptor transducers and brackets can be mounted on a existing communications bulkhead or included in the bulkhead's initial design. Finally, the controller, database, and user interface can be an add on system with separate components, or these capabilities can be incorporated in the processing system already in existence for the system.

The foregoing description of the present invention has been presented for purposes of illustration and description. Furthermore, the description is not intended to limit the invention to the form disclosed herein. Consequently, variations and modifications commensurate with the above teaching, and the skill or knowledge of the relevant art, are within the scope of the present invention. The embodiments described hereinabove are further intended to explain best modes known for practicing the invention and to enable others skilled in the art to utilize the invention in such or other embodiments and with various modifications required by the particular applications or uses of the present invention. It is intended that the claims be construed to include alternative embodiments to the extent permitted by the prior art.

What is claimed is:

1. An apparatus for monitoring a connection between a communications line connector and an adapter, the apparatus comprising:

first identification means, disposed proximate to the communications connector, for use in communicating connection information regarding the connection between the communications connector and the adapter; and second identification means, mountable proximate to the adapter, for use in communicating the connection information regarding said connection;

wherein the connection information is communicated between a controller and one of the first and second identification means so as to allow for monitoring of the connection.

2. The apparatus of claim 1, wherein said connector is for a fiber optic communications line and said adapter is a fiber optic adapter.

3. The apparatus of claim 1, wherein one of said first and second identification means includes a transducer which transmits a signal containing a portion of the connection information.

4. The apparatus of claim 3, wherein the signal is an electromagnetic signal.

5. The apparatus of claim 3, wherein the signal is one of a radio frequency signal and an optical signal.

6. The apparatus of claim 1, wherein one of said first and second identification means includes means for receiving a signal from the controller, wherein the signal is used to assist a technician in making the connection.

7. The apparatus of claim 1, wherein said adapter is mountable on a bulkhead of a communications panel.

8. The apparatus of claim 1, wherein the controller provides connection status information in response to receipt of the connection information.

9. The apparatus of claim 5 wherein the first identification means transmits the connection information in response to receiving a first signal from the second identification means.

10. The apparatus of claim 9 wherein the first identification means receives energy to transmit the connection information from the first signal.

11. The apparatus of claim 10 wherein the first identification means transmits the connection information in a second radio signal.

12. An apparatus for monitoring connections in a communications system comprising:
at least one communication line with at least one connector attached thereto, where an identification transducer is included in the at least one connector and the identification transducer contains identification information for the at least one communication line;
at least one adapter which receives the at least one connector and establishes a connection for the communications signals; and
an adapter transducer mountable proximate to the adapter which receives the identification information from the identification means and transmits the identification information to a controller.

13. The apparatus of claim 12, wherein said communication line carries fiber optic signals.

14. The apparatus of claim 12, wherein said identification means is a transmitter which transmits a signal containing the identification information to the receiver.

15. The apparatus of claim 14, wherein said signal is an electromagnetic signal.

16. The apparatus of claim 15, wherein said signal comprises one of a radio frequency signal and an optical signal.

17. The apparatus of claim 12, wherein said adapter transducer is adapted to receive an identification signal from the controller, wherein an indication is provided in response to identification signal to indicate the connection that is to be made.

18. The apparatus of claim 12, wherein said adapter is mounted on a bulkhead of a communications panel.

19. The apparatus of claim 12, wherein the controller provides connection status information in response to the receipt of the identification information.

20. The apparatus of claim 19, wherein said connection status information is provided through a visual indicator.

21. The apparatus of claim 20, wherein the visual indicator is located proximate to the at least one adapter.

22. The apparatus of claim 16 wherein the identification transducer transmits the identification information in response to receiving a first radio signal from the adapter transducer.

23. The apparatus of claim 22 wherein the identification means receives energy to transmit the identification information from the first radio signal.

24. The apparatus of claim 23 wherein the identification means transmits the identification information in a second radio signal.

25. A system according to claim 12, wherein said communications device is a patch cable.

26. A communications system comprising:
a plurality of communication lines;
an identification transducer mountable on each of said plurality of communication lines, where each of said identification transducers contains identification information for the communication line upon which said identification transducer is mounted;
a communications bulkhead with a plurality of adapters mounted thereon, each of said adapters receives one of the plurality of communications lines;
an adapter transducer mountable proximate to each of said adapter means, said adapter transducer receives the identification information from the identification transducer; and
a controller which receives the identification information from the adapter transducers and provides connection status information for each of the plurality communications lines and adapters.

27. The communications system of claim 26 wherein the plurality of communication lines are fiber optic cables.

28. The communications system of claim 26, wherein said identification transducers transmit signals containing the identification information to the adapter transducers.

29. The apparatus of claim 28, wherein the signals are electromagnetic signals.

30. The apparatus of claim 26, wherein said controller is further operative for transmitting an identification signal to identify, based on said identification information, a selected communication line and a selected adapter to be connected.

31. The apparatus of claim 26, further comprising means for aligning a given communications line with a given adapter such that a given transducer of said given line is positioned proximate to a given adapter transducer of said given adapter when said line is coupled to said adapter.

32. The apparatus of claim 26, wherein said connection status indicator information is provided through at least one visual indicator.

33. The apparatus of claim 32, wherein each of the plurality of adapters has one of the visual indicators located proximately thereto.

34. The apparatus of claim 33 wherein the visual indicator is at least one light emitting diode.

35. A system according to claim 26, wherein the plurality of communications lines are patch cables.

36. The communications system of claim 26 further including a database which stores the connection status information and other information relating to the communications network.

37. A system according to claim 36, wherein the database includes information about the location and connection status for each of the plurality of connectors and adapters.

38. A method for monitoring connections in communications system, comprising:
mounting an identification transducer on each of a number of communications lines within the communication system;

mounting an adapter transducer device on each of a number of adapters which receive the communications lines;

transferring identification information between one of the identification transducers and one of the adapter transducers, where the identification information identifies a connection between one of the communications lines and one of the transducers; and transmitting the identification information between a controller, which monitors connections between the communications lines and the adapters, and one of said one identification transducer and said one adapter transducer.

39. A method according to claim 38, wherein the step of transferring of identification information is done with a transmission signal which contains the identification information.

40. A method according to claim 39, wherein the transmission signal is an electromagnetic signal.

41. A method according to claim 40, wherein said transmission signals is a radio frequency signal.

42. A method according to claim 38, wherein said identification transducers receive power to transmit transmission signals from a radio signal transmitted by the transducer.

43. A method according to claim 38 wherein the communications system processes fiber optic signals.

44. A method according to claim 38, further including the step of providing a visual indication based on connection status information.

45. A method according to claim 38, wherein said step of transmitting comprises communicating a signal from said controller to identify an adapter for use in making the connection.

46. A method according to claim 38, further comprising the step of angularly aligning said one line and said one adapter relative to positions of said one identification transducer and said one adapter transducer and coupling said line to said adapter.

47. An apparatus for use in monitoring connections in a communications system, said system including adapters for receiving communications lines so as to make said connections and further including detectors, associated with said adapters, for use in detecting a line connection and reporting the line connection to a controller for storing information regarding the line connection so as to allow for monitoring said connections in said communications system, said apparatus comprising:

communications line means for use in transmitting communications signals, said line means including a section of a communications line and at least one end portion for coupling to one of said adapters of said communications system; and identification means, associated with said communications line, for identifiing said communications line, said identification means including means for providing a unique identifier for said communications line means and means for communicating with a detector of said one adapter so as to provide identification information relative to said unique identifier to said detector of said one adapter when said end portion of said communication line means and said adapter are engaged;

wherein said identification information can be reported to said controller by said detector so as to allow for enhanced monitoring of said connections in said communications system.

48. The apparatus of claim 47, wherein said communications line comprises a fiber optic line and said end portion comprises a fiber optic connector.

49. The apparatus of claim 47, wherein said identification means comprises a chip for storing a programmed identification code.

50. The apparatus of claim 47, wherein said identification means comprises transceiver means for receiving signals from said detector and transmitting signals to said detector across an air interface between said detector and said transceiver means.

51. The apparatus of claim 47, wherein said identification means comprises self-powering means for receiving a signal from said detector and deriving energy from said received signal for powering operation of said identification means.

* * * * *